US006914899B2

(12) United States Patent
Siegrist et al.

(10) Patent No.: US 6,914,899 B2
(45) Date of Patent: Jul. 5, 2005

(54) CALLER IDENTIFICATION AND VOICE/DATA SYNCHRONIZATION FOR INTERNET TELEPHONY AND RELATED APPLICATIONS

(75) Inventors: Joseph Siegrist, Silver Spring, MD (US); Amen Zwa, Owings Mills, MD (US); Ian Hunter, Oak Hill, VA (US)

(73) Assignee: eSTARA, Inc., Reston, VA (US)

( * ) Notice: Subject to any disclaimer, the term of this patent is extended or adjusted under 35 U.S.C. 154(b) by 871 days.

(21) Appl. No.: 09/771,991

(22) Filed: Jan. 30, 2001

(65) Prior Publication Data

US 2002/0101853 A1 Aug. 1, 2002

(51) Int. Cl.$^7$ ............................................. H04L 12/66
(52) U.S. Cl. ...................... 370/354; 370/352; 370/389; 379/93.03
(58) Field of Search ................................ 370/260, 261, 370/310, 352–356, 383, 389, 392, 399, 400, 401, 409, 493, 525; 379/112.01, 133, 93.01, 93.06; 705/7; 709/206

(56) References Cited

U.S. PATENT DOCUMENTS

| | | |
|---|---|---|
| 5,421,009 A | 5/1995 | Platt |
| 5,604,737 A | 2/1997 | Iwami et al. |
| 5,608,786 A | 3/1997 | Gordon |
| 5,742,596 A | 4/1998 | Baratz et al. |
| 5,751,706 A | 5/1998 | Land et al. |
| 5,764,756 A | 6/1998 | Onweller |
| 5,786,770 A | 7/1998 | Thompson |
| 5,790,538 A | 8/1998 | Sugar |
| 5,835,713 A | 11/1998 | FitzPatrick et al. |
| 5,838,665 A | 11/1998 | Kahn et al. |
| 5,845,077 A | 12/1998 | Fawcett |
| 5,850,433 A | 12/1998 | Rondeau |
| 5,867,494 A | 2/1999 | Krishnaswamy et al. |
| 5,867,495 A | 2/1999 | Elliott et al. |
| 5,870,547 A | 2/1999 | Pommier et al. |
| 5,870,610 A | 2/1999 | Beyda |
| 5,875,296 A | 2/1999 | Shi et al. |
| 5,883,891 A | 3/1999 | Williams et al. |
| 5,889,774 A | 3/1999 | Mirashrafi et al. |

(Continued)

FOREIGN PATENT DOCUMENTS

| | | |
|---|---|---|
| EP | 0 843 454 | 5/1998 |
| EP | 0 866 596 | 9/1998 |
| WO | WO 98/20667 | 5/1998 |

OTHER PUBLICATIONS

Coffman, James E., "Extending internet calls to a telephone call center", Eurpean Patent Application EP0843454A2, 05/20/199.*

Primary Examiner—Wellington Cain
Assistant Examiner—John Shew
(74) Attorney, Agent, or Firm—DLA Piper Rudnick; Gray Cary US LLP

(57) ABSTRACT

An data packet network telephony system provides identification information of an end user terminal making an Internet telephone call to a call center terminal and provides a call center agent with the ability to cause an end user terminal making an Internet telephone call to display selected web pages and or to synchronize displays between the agent and end user terminals. In one embodiment, customer identification information is provided in-band. In another embodiment, customer identification information is accomplished out of band, in some cases using an identifier of the PSTN gateway as an index into a table to identify an end user terminal. In another embodiment, an agent may enter DTMF (dual tone multi-frequency tones) to push web pages to an end user terminal. In still other embodiments, a second communications link between the end user terminal and the agent's terminal is established, allowing for data sharing/synchronization.

44 Claims, 4 Drawing Sheets

U.S. PATENT DOCUMENTS

| | | | | |
|---|---|---|---|---|
| 5,892,764 A | | 4/1999 | Riemann et al. | |
| 5,907,547 A | | 5/1999 | Foladare et al. | |
| 5,907,605 A | * | 5/1999 | Ramirez et al. | 379/376.01 |
| 5,909,545 A | | 6/1999 | Frese, II et al. | |
| 5,919,247 A | | 7/1999 | Van Hoff et al. | |
| 5,923,844 A | | 7/1999 | Pommier et al. | |
| 5,941,957 A | | 8/1999 | Ingrassia, Jr. et al. | |
| 5,944,791 A | | 8/1999 | Scherpbier | |
| 5,953,322 A | | 9/1999 | Kimball | |
| 5,953,331 A | | 9/1999 | Duncan et al. | |
| 5,953,332 A | | 9/1999 | Miloslavsky | |
| 5,956,334 A | | 9/1999 | Chu et al. | |
| 5,970,065 A | | 10/1999 | Miloslavsky | |
| 5,982,767 A | | 11/1999 | McIntosh | |
| 5,987,102 A | | 11/1999 | Elliott et al. | |
| 5,991,394 A | | 11/1999 | Dezonno et al. | |
| 6,008,804 A | | 12/1999 | Pommier et al. | |
| 6,011,792 A | | 1/2000 | Miloslavsky | |
| 6,011,794 A | | 1/2000 | Mordowitz et al. | |
| 6,026,087 A | | 2/2000 | Mirashrafi et al. | |
| 6,031,896 A | | 2/2000 | Gardell et al. | |
| 6,047,314 A | | 4/2000 | Pommier et al. | |
| 6,049,671 A | | 4/2000 | Slivka et al. | |
| 6,064,653 A | | 5/2000 | Farris | |
| 6,064,667 A | | 5/2000 | Gisby et al. | |
| 6,069,890 A | | 5/2000 | White et al. | |
| 6,069,891 A | | 5/2000 | Mandalia et al. | |
| 6,075,783 A | | 6/2000 | Voit | |
| 6,075,784 A | | 6/2000 | Frankel et al. | |
| 6,078,581 A | | 6/2000 | Shtivelman et al. | |
| 6,078,582 A | | 6/2000 | Curry et al. | |
| 6,118,864 A | | 9/2000 | Chang et al. | |
| 6,122,255 A | | 9/2000 | Bartholomew et al. | |
| 6,125,113 A | | 9/2000 | Farris et al. | |
| 6,128,291 A | | 10/2000 | Perlman et al. | |
| 6,141,341 A | | 10/2000 | Jones et al. | |
| 6,141,345 A | | 10/2000 | Goeddel et al. | |
| 6,144,670 A | | 11/2000 | Sponaugle et al. | |
| 6,144,991 A | | 11/2000 | England | |
| 6,199,096 B1 | | 3/2001 | Mirashrafi et al. | |
| 6,212,192 B1 | | 4/2001 | Mirashrafi et al. | |
| 6,298,056 B1 | | 10/2001 | Pendse | |
| 6,304,637 B1 | | 10/2001 | Mirashrafi et al. | |
| 6,310,941 B1 | | 10/2001 | Crutcher et al. | |
| 6,487,196 B1 | * | 11/2002 | Verthein et al. | 370/352 |
| 6,678,718 B1 | * | 1/2004 | Khouri et al. | 709/204 |
| 6,690,654 B2 | * | 2/2004 | Elliott et al. | 370/260 |

* cited by examiner

CALLER IDENTIFICATION AND VOICE/ DATA SYNCHRONIZATION FOR INTERNET TELEPHONY AND RELATED APPLICATIONS

BACKGROUND OF THE INVENTION

1. Field of the Invention

The present invention relates to the provision of communications services using terminal devices that include computing devices connected to packet-switched communications networks.

2. Discussion of the Background

Users of personal computers (PCs) and other general purpose digital computing devices have been able to engage in voice communications using these devices for many years. One example of software for enabling PC-to-PC communication over the Internet is the SpeakFreely shareware which has been available since 1991. More recently, refined commercial grade products have emerged such as those offered by VocalTec, Net2Phone, Netspeak, and many others. By utilizing the Internet or other packet switched networks, such products have given rise to convergent voice and data solutions as well as created the potential for commercial applications in the realm of e-commerce.

The assignee of the present application, eStara Inc., has addressed some of the limitations of these solutions by inventing methods for installing and initializing media applications using a "thin client" model. These methods are described in U.S. patent application Ser. Nos. 09/272,139, entitled "Public Web Phone System," 09/637,805, entitled "Universal Internet Based Telephony System That Provides Ubiquitous Access For Subscribers From Any Terminal Device," and 09/771,993, now U.S. Pat. No. 6,707,811, issued Mar. 16, 2004, entitled "Internet Telephony for e-Commerce." The contents of each of these applications are hereby incorporated herein by reference. These methods and processes created a particular opportunity for enabling end users to make contact with call centers operated by merchants associated with a web site by clicking on icons displayed on web pages. In particular, when such an icon is clicked, an Internet telephony call between the end user (using their terminal as an Internet phone) and a call center agent is established without requiring the end user to have any Internet telephony software previously installed on their terminal, all the while allowing the end user to remain on the merchant's web page from which the call was initiated. The resulting voice connections link an end user and a call center agent who may be using either a telephone or a voice-over-Internet enabled computer device.

One of the obvious problems in providing voice connections to link PC users to call center agents is providing caller identification in a mixed telecommunications environment, where the caller is using an Internet based or packet switched network and the call center agent is equipped with a telephone device attached to the public switched telephone network (PSTN) and a computing device that provides automated support for order entry, customer service, or other processes. These call centers use sophisticated call management and customer relationship management systems that display key information about the customer's history, buying preferences, and purchasing behavior. In order for these systems to function, it is necessary to identify the customer making the incoming call. As is well known in the art, call centers often use information such as the ANI (automatic number identification), DNIS (dialed number identification service), or callerID™ to identify an incoming call. This allows the call center to display "screen pops" that enable the call center agent to exploit telephone caller identification information to pull up customized screens that include scripts for the agent.

When an end user makes an Internet telephony call to a call center, a PSTN gateway is necessarily involved. A PSTN gateway is a device that bridges a call from a packet switched network such as the Internet to a circuit switched network such as the PSTN. This scenario creates a problem for the call center because the identifying information (ANI, DNIS, or callerID) received at the call center identifies the PSTN gateway rather than the customer. In order to perform the screen pop in conventional systems, the call center agent must then ask the customer for identifying information (e.g., name, phone number or account number). This is problematic for two reasons: first, it may be annoying to some customers; and second, it takes time to ask for, receive, and key in this information.

One proposed solution to this problem, described in a European patent application filed by Lucent Technologies (EP 0,843,454), is to have the Internet-based callers enter information in a dialogue box at the time they initiate a call and to pass this information through the PSTN using the call setup fields within the signaling system. This approach enables the call center systems to provide a "screen pop" at the outset of the voice conversation, but it may require redundant data entry on the part of a caller who may already be logged into a merchant's call site. Thus, this proposed solution solves one of the aforementioned problems (time wasted by the call center agent in asking for, receiving, and entering customer identification information), but does not address the second problem (customer annoyance at having to enter identification information).

What is needed is an automatic method for identifying a customer making an Internet telephony call to a call center.

Another problem common in e-commerce interactions between customers or prospects and call center agents is a desire to share text, multimedia, or graphical data in addition to the voice interaction. There are a variety of well-known methods for "pushing" data or for "co-browsing" by two or more web users, but all of these methods depend on having a known IP address or universal resource locator (URL) for all parties to the interactive session. In the case of a mixed telephony environment as described above, an Internet telephony service may not be able to identify which call center computing device is associated with which telephone conversation. This is especially true when calls are distributed by an automated call distribution device attached to the public switched network that does not communicate with other call center systems (such as customer relationship management software). What is needed is a method whereby data can be shared between an end user terminal and a call center agent terminal when the call center agent's terminal data packet network address is not known to the end user terminal and the end user terminal's data packet network address is not known to the call center agent's terminal.

Some call centers do not have automated systems attached to the world wide web, but still may wish to "push" web content to callers who are connected to the web. What is needed is a simple method for such a party to push web content to such callers.

SUMMARY OF THE INVENTION

The present invention meets the foregoing need to a great extent by providing a method and apparatus that provides identification information of an end user terminal making an Internet telephone call to a call center terminal and provides a call center agent with the ability to cause an end user terminal making an Internet telephone call to display selected web pages and/or to synchronize displays between the call center agent and end user terminals. In one embodiment of the invention, customer identification information is provided in-band. In another embodiment of the invention, customer identification information is accomplished out of band, in some cases using an identifier of the PSTN gateway as an index into a table to identify an end user terminal. In another embodiment, a call center agent may enter DTMF (dual tone multi-frequency tones) to push web pages to an end user terminal. In still other embodiments, a second communications link between the end user terminal and the call center agent's terminal is established, allowing for data sharing/synchronization.

BRIEF DESCRIPTION OF THE DRAWINGS

A more complete appreciation of the invention and many of the attendant advantages and features thereof will be readily obtained as the same becomes better understood by reference to the following detailed description when considered in connection with the accompanying drawings, wherein.

DESCRIPTION OF PREFERRED EMBODIMENTS

The present invention will be discussed with reference to preferred embodiments of Internet telephony identification/synchronization applications. Specific details, such as steps in establishing the Internet telephone call and information included with icons, are set forth in order to provide a thorough understanding of the present invention. The preferred embodiments discussed herein should not be understood to limit the invention. Furthermore, for ease of understanding, certain method steps are delineated as separate steps; however, these steps should not be construed as necessarily distinct nor order dependent in their performance. Still further, devices (such as servers) described herein as separate entities may be implemented on separate physical devices and/or as separate processes running on a single physical device.

Figure 1:
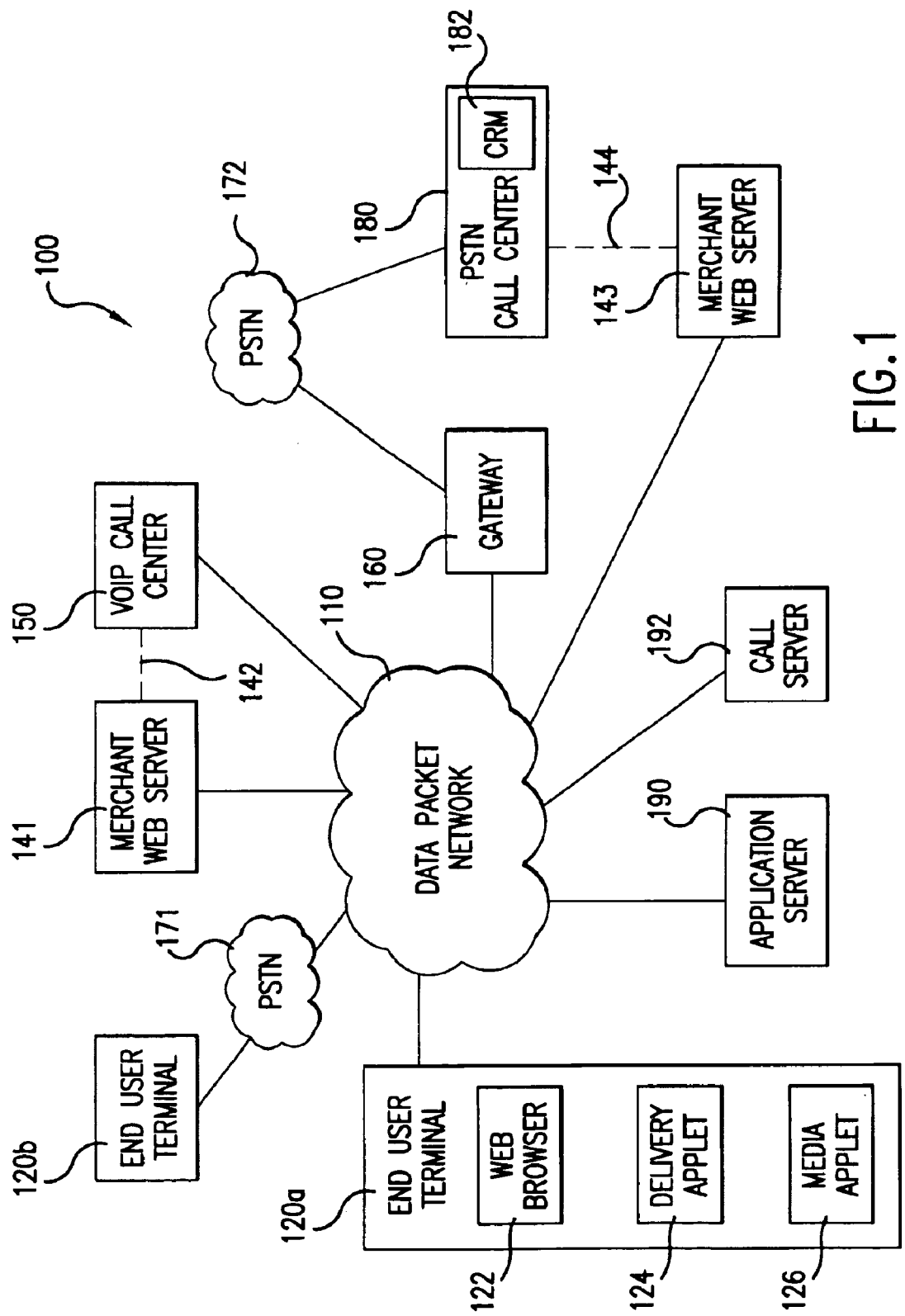
FIG. 1 is a block diagram illustrating an exemplary communication system according to one embodiment of the present invention.

Before proceeding further, it is necessary to describe various configurations and equipment that may be involved in an Internet telephone call. Referring now to the drawings, wherein like reference numerals designate identical or corresponding parts throughout the several views, FIG. 1 illustrates a communications systems 100 including a data packet network 110 such as the Internet. Connected to the data packet network 110 are end user terminals 120a, b. End user terminal 120a is directly connected to the data packet network 110, while end user terminal 120b is connected to the data packet network 110 through the PSTN (public switched telephone network) 171 using a typical dial-up connection via a modem to an Internet service provider (not shown in FIG. 1). For the purposes of the present invention, either type of connection may be used. Each of the terminals 120 includes a web browser 122.

An end user at the terminal 120 may view web pages from a variety of sources using web browser 122 (not shown in terminal 120b solely for the sake of convenience), including merchant web servers 141, 143 which are also connected to the data packet network 110. Each of the merchant web servers 141, 143 includes an icon for establishing a VoIP telephone call to an associated call center. In preferred embodiments, the icon will include an address for an application server 190. Preferably, the icon will also include icon identification information, which may include one or more of the following: a session ID (an identifier of a browsing "session" which is assigned by the server being browsed), a customer ID (an identifier of the end user doing the browsing), a link ID (an identifier of the icon clicked on by the end user), or a telephone number associated with a call center.

When the end user at the terminal 120 clicks on the icon, a message is sent to the application server 190. In response, the application server 190 sends a delivery applet 124 to the end user terminal 120. The delivery applet will then determine whether a media application 126 is present and, if not, will obtain a media application from the application server 190 (alternatively, the media application 126 may be automatically sent with, or included in, the delivery applet 124). The media application 126 controls the low level operation (e.g., digitizing and packeting analog voice samples) of an Internet telephone call. Next, the delivery applet 124 sends a message to a call server 192 to inform the call server 192 that an Internet telephony call to a call center is desired.

When the icon is provided by the merchant web server 141, a "pure" Internet telephony call between the respective end user terminal 120 and a VoIP-ready call center 150 associated with the merchant web server 141 (as indicated by dashed line 142) is desired. In a pure VoIP call, packets are exchanged between the respective end user terminal 120 and the call center 150 directly through the data packet network 110 without using the PSTN. When the icon is provided by merchant web server 143, the VoIP telephone call must be routed through a gateway 160 and the PSTN 172 to a conventional call center 180, which is not VoIP-ready, associated with the merchant web server 143 as indicated by the dashed line 144. Such an Internet telephone call between an end user terminal connected to the Internet and a call center connected to the PSTN shall be referred to herein as a mixed Internet telephone call.

The identification of the desired call center (which also determines whether the call will be a pure Internet telephone call or a mixed Internet telephone call) may be made in a variety of ways. In some embodiments, the icon identification information includes a phone number, which in and of itself identifies the call center. In other embodiments, a merchant ID, a link ID, or a combination of the two, are used as an index into a table maintained at the call server 192 to identify the desired call center. Other methods for determining the desired call center, including more sophisticated methods which rely on factors other than information included in the icon, such as time of day and geography, are also possible.

If the desired call center corresponds to a VoIP-ready call center 150, the call server 192 sets up the call by contacting the call center 150, informing it that a call is desired, and exchanging voice packet addresses between the media applet 126 at the end user terminal 120. Once the call has been set up, the media application 126 exchanges voice packets with an address at the call center 150.

If the desired call center corresponds to a PSTN call center 180, the call server 192 informs the gateway 160 to connect to the call center 180 via the PSTN 172. The call server then sets up an exchange of packets between the media applet 126 at the terminal 120 and the gateway 160. In this situation, a packet is sent from the terminal 120 to the gateway 160. The gateway 160 unpacks the packet, converts the digital information into analog form, and transmits it to the call center 180 over the PSTN 172 (PSTN 171 and PSTN 172 may be part of the same public switched telephone network, but are shown separately in FIG. 1 for the purposes of illustration). The gateway also receives voice information in analog form from the PSTN call center 180, digitizes and packetizes the analog information, and sends the packets to the appropriate end user terminal 120.

Caller Identification at the Call Center

It will be apparent to those of skill in the art that, in the situation described above in connection with the call to the PSTN call center 180, the identity of the end user at the terminal 120 is not known to the call center at the start of the call. In order to overcome this problem, several strategies are available. These strategies may be divided into two types: in-band signaling and out-of-band signaling. In-band signaling refers to providing identification data in the same frequency band as voice data (that is, as an audible signal), while out-of-band signaling refers to providing identification data in another manner.

In some in-band embodiments, customer identification information is encoded in the telephone call by the call server 192. The customer identification may come from a variety of sources. For example, some or all of the icon identification information (e.g., the customer ID, session ID), which is inserted in the icon by the merchant web server 141, is used as the customer identification information in some embodiments. Alternatively, the media applet 126 and/or delivery applet 124 searches the hard drive at the terminal 120 to gather cookies or other information that identifies the customer. The media applet 126 and/or the delivery applet 124 transmit the customer identification information to the gateway 160 (either directly or through the call server 192). Once received at the gateway 160, the customer identification information is used to replace the ANI delivered to the call center 180. In other embodiments, the same information is encoded into other fields, such as Signaling System 7 fields, associated with the telephone call instead of replacing the ANI. In still other embodiments, the desired identification data is transmitted at the start of a phone call in a manner similar to that of a facsimile machine (i.e., it is transmitted in the same manner as voice information in the phone call). Other variations on this theme are also possible. (In a pure Internet telephony call to a VoIP call center 150, the same types of customer identification information can be included in the packets sent from the terminal 120 to call center 150.) The information added in this process is then detected and passed to a customer relationship management system at the call center agent's station to perform the screen pop. In this manner, the screen pop is performed at the start of the call without requiring the end user to manually type their customer identification information, thereby saving time and aggravation.

In the foregoing embodiments, the customer identification information is passed to the gateway 160 for inclusion into the telephone call. In alternative embodiments, the customer identification information is converted to an audible signal such as a DTMF tone, encoded into data packets at the end user terminal 120, and transmitted through the gateway 160 to the call center 180 in the same manner as voice data packets. (The packets may be preformed—that is, digitized data corresponding to individual numbers and symbols on a telephone dialpad may be included with the media applet 126 or the delivery applet 124 such that combinations of the digitized data may be combined to form one or more packets for a desired command). The packets are received at the gateway 160, converted into an analog signal and transmitted to the call center 180 over the PSTN. The call center 180 then detects the presence of the tones, converts the tones into corresponding customer identification information and uses the information to perform the screen pop as described above. One feature of this method is that it does not require a specially modified gateway.

In one out-of-band strategy, the call center 180 recognizes that an incoming call originates from a telephone because the ANI (or DNIS or caller ID) corresponds to a PSTN gateway 160. A customer relationship management (CRM) system computer 182 at the call center 180 then queries a database maintained by the call server 192 or gateway 160 to correlate an incoming call to a particular customer. For example, in one embodiment the CRM computer 182 sends a message to the call server 192 that includes the ANI associated with the received call. The call server 192, which stores customer identification information received from the terminal 120, then determines the last call it instructed the gateway 160 associated with the ANI to set up, retrieves the appropriate customer identification information, and sends it to the call center 180.

Alternatively, the gateway 160 may be configured to include different ANIs in each phone call and report this information to the call server 192 for each call the call server 192 commands the-gateway 160 to place. The call server 192 maintains a table of ANI/customer information pairings so that when it receives an inquiry for an ANI from the CRM computer 182, it simply uses the ANI as an index into the table to retrieve the corresponding customer information and passes it along to the CRM computer 182.

Figure 2:
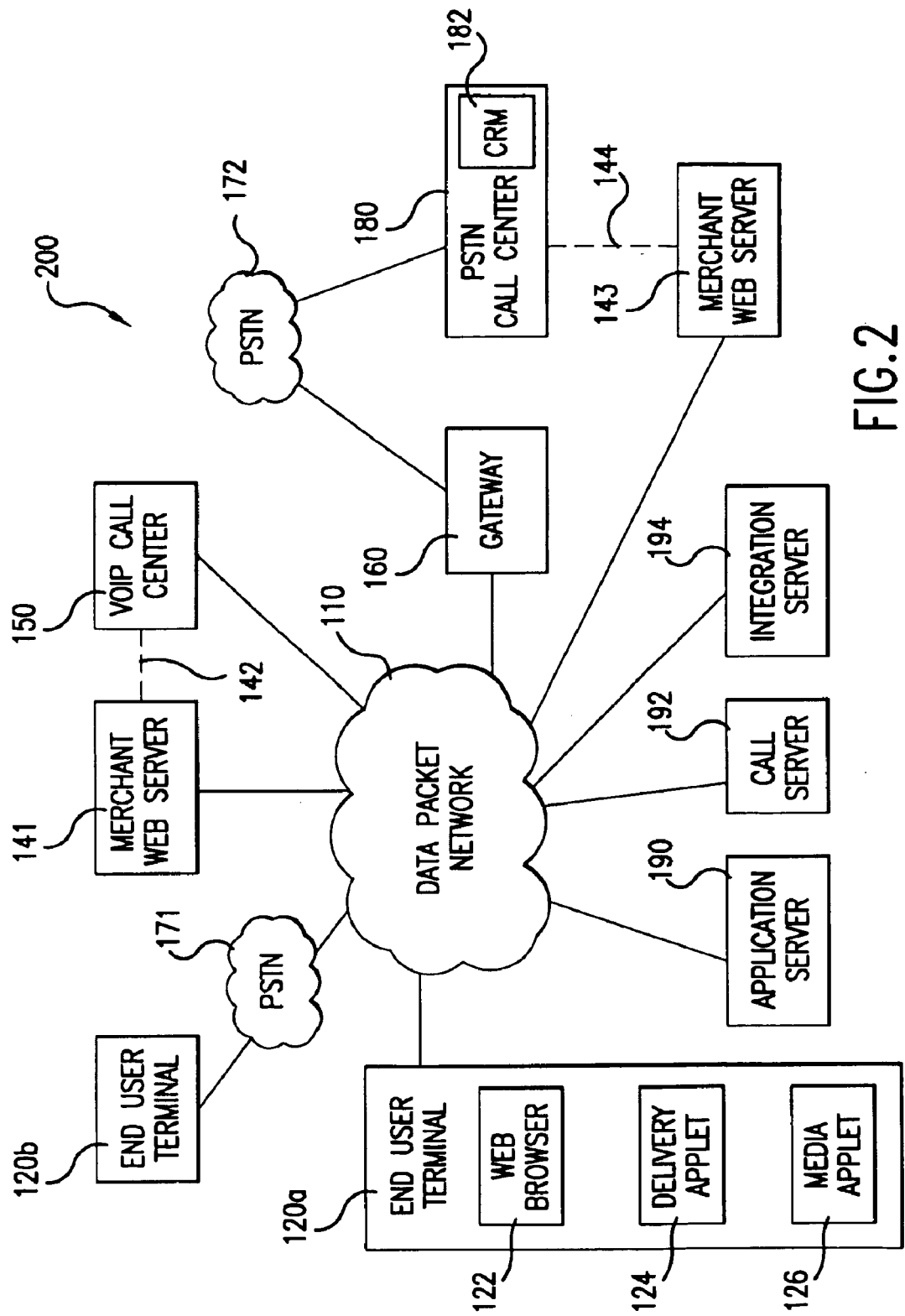
FIG. 2 is a block diagram illustrating an exemplary communication system according to a second embodiment of the present invention.

Another out-of-band embodiment is illustrated in FIG. 2. The system 200 is similar to the system 100 of FIG. 1, except that an integration server 194 has been added. A call from the terminal 120 to the PSTN call center 180 is initiated when the end user clicks on an icon at the merchant web server 143 in the same manner as described above. When the terminal 120 is informed by the call server 192 of the port at the gateway 160 to which voice packets are to be sent, the terminal 120 also sends a message to an integration server 194 that includes some or all of the customer identification information and the associated port number. The process then continues as described above until the PSTN gateway 160 places the call to the call center 180. The call center 180 then obtains the ANI for the phone call and does a table lookup, using the ANI as an index, that reveals the ANI is associated with the gateway 160. The call center 180 then passes the ANI to the integration server 192. The integration server 192 uses the ANI to determine with which port number of the gateway 160 the call is associated. Each port (to which packets are sent by the media application 126) on the gateway 160 is mapped to a single ANI. Once the port number of PSTN gateway 106 is received, the integration server 194 simply uses it as an index to retrieve the customer identification information. This customer identification information is then sent to the call center CRM system 182 for use by the call center 120. In some "pure" Internet telephony embodiments, the integration server 192 functions in a manner similar to that described above, with an pseudo-ANI being supplied by the terminal 120.

Control/Synchronization

It is also possible for an agent at a call center to control the display of web pages at the terminal 120. Providing this ability to the call center agent is especially useful because it can allow a call center agent to synchronize an end user's display with a display at a terminal used by the agent. However, this ability is also useful even where the call center agent does not have a terminal.

In one embodiment, the customer service representative enters a dialpad sequence (e.g., *76) on his telephone. The dialpad sequence is detected by the PSTN gateway 160 and interpreted as a display command. The PSTN gateway 160 strips the dialpad sequence out of the audio information (so that it is not heard by the end user) that is to be packetized and passes the dialpad sequence to the call server 192. The call center 192 either passes the dialpad sequence directly to the delivery applet 124, or uses the dialpad sequence (or some portion thereof) as an index to retrieve a URL which is sent to the delivery applet 124. The delivery applet 124 then sends this information (the "76" or the URL) to the web server 143 in a download ( ) message, which causes the web server 143 to send the corresponding web page to the end user terminal 120.

In those embodiments in which the dialpad sequence is used by the call server 192 as an index to retrieve a URL, the call server 192 is required to maintain a table of URLs, which must of course be supplied and updated by the merchant. Thus, it may be preferable to simply pass the dialpad sequence to the merchant server, which itself can use the sequence as an index to determine which page to download.

In the embodiment described above, the dialpad sequence is detected at the gateway 160. In an alternative embodiment, the dialpad sequence is digitized and included in voice packets sent to the terminal 120, where it is detected and sent to the web server 143 in a download ( ) message or used to retrieve a URL which is sent to the web server 143 in a download message as previously described. There are advantages and disadvantages associated with both methods. Detecting the dialpad sequence at the gateway 160 requires that a standard gateway be modified to detect the dialpad sequence, strip it out, and send it to terminal 120. However, detecting the dialpad sequence at the gateway 160 rather than at the terminal 120 avoids the problems associated with missing portions of the dialpad sequence due to packet loss an/or inaccuracies that can be caused by variations in compression technologies on the packet switched (i.e., the Internet) and circuit switched (i.e., PSTN) networks.

Figure 3:
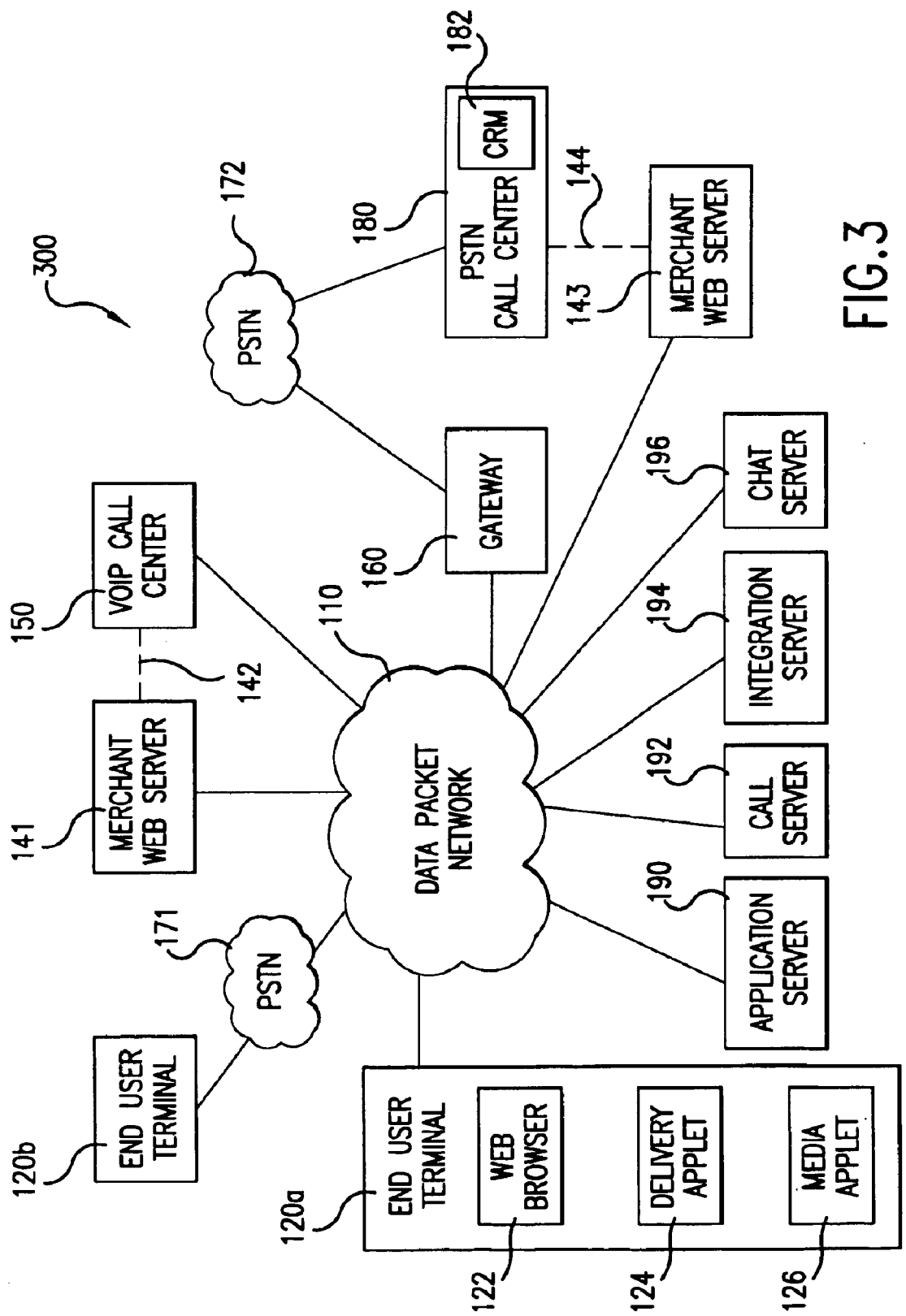
FIG. 3 is a block diagram illustrating an exemplary communication system according to a third embodiment of the present invention.
Figure 4:
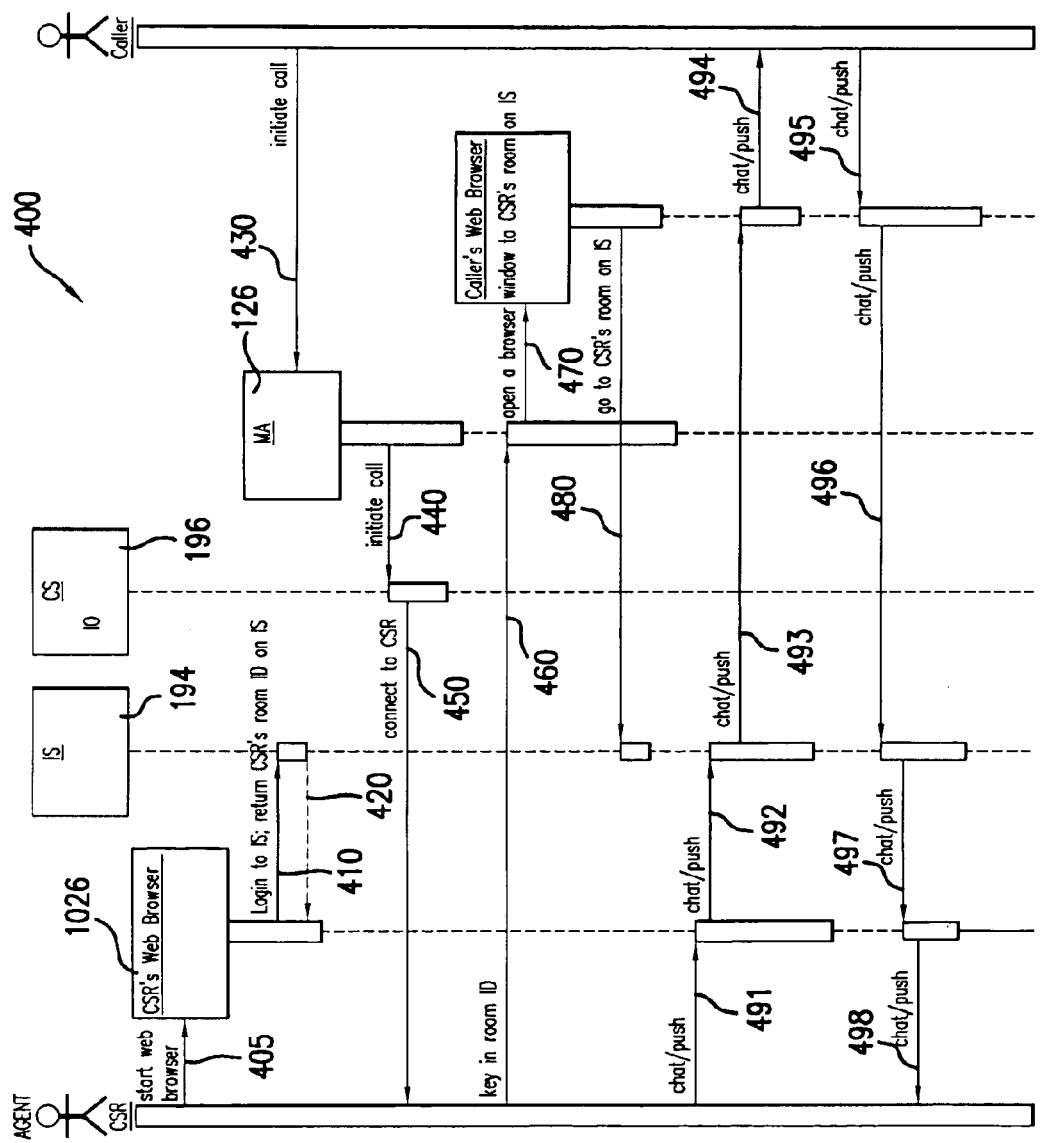
FIG. 4 is a sequence diagram illustrating steps involved in establishing communications through a chatroom according to the embodiment of FIG. 3.

Yet another strategy for controlling a display at the terminal 120 and/or synchronizing displays at the terminal 120 and an agent terminal at the call center 180 is illustrated by the system 300 of FIG. 3 and the sequence diagram 400 of FIG. 4. In this embodiment, an agent at the call center 180 begins each work day by starting a web browser at step 405 and logging on to a chat server 196 at step 410. When the agent logs on, the chat server 196 returns a chatroom ID, which is preferably a short (e.g., 2–4 digit) numeric code, at step 420. In preferred embodiments, this chatroom ID corresponds to one of a number of chatrooms hosted on the integration server 194. The foregoing preferably occurs before any calls are handled by the agent.

Next, an end user viewing a web page from merchant web server 143 clicks on an Internet telephony icon at step 430. This initiates a call to call center 180 at step 440. When the call is routed through an ACD (automatic call distributor) at the call center to the particular agent at step 450, the agent keys in the chatroom ID using the telephone handset at step 460. This causes DTMF signals to be transmitted to the media application 126. (In alternative embodiments, the DTMF signals are detected at the gateway 160 and translated into a message which is sent to the terminal 120.) The media application 126 recognizes the DTMF signals as a chatroom ID and opens a new browser window at step 470. Next, the digits represented by the signals are appended to a predetermined URL portion (e.g., the predetermined URL portion forms the first part of the URL and the chatroom ID is appended as "/xx" where "xx" is a two digit chatroom ID) to form a chatroom URL and the newly-opened web browser window is directed to the corresponding chatroom at step 480. The agent, who also knows the address of the chatroom based on the code he entered, may then send information to the caller through the chatroom on the integration server 194 at steps 491–494, and the caller may send information to the agent at steps 495–498. This information may comprise standard chat messages. This information may also include web push information—that is, commands including URLs that cause the terminal to request web pages corresponding to the URLs to be downloaded in the manner described above.

The foregoing technique has several advantages over other techniques. First, the technique requires no changes to existing call centers (unlike the embodiment described above, wherein the call center must be modified to recognize the PSTN gateway ANI and perform special processing in response thereto). Second, the method is more reliable than methods that rely on the ANI because ANI numbers are sometimes lost when a call crosses phone network boundaries. It should also be recognized that the foregoing technique is not limited to exchanging chatroom messages and/or facilitating web pushes. Any kind of information may be exchanged. For example, this technique could be used to set up a channel to allow the terminal 120 to send cookie information, or other information that identifies the caller, to the agent.

It is not necessary to utilize a chatroom to facilitate communications between the end user and the agent. As an alternative to such embodiments, in which a chatroom hosted on an intermediate computer is used to synchronize the displays of the parties to the call, a direct communications channel such as an SSL socket could be established between the end user and agent terminals. For example, the DTMF signals (whether detected at the gateway and sent to the end user computer by the gateway through the data packet network or detected at the end user computer itself from decoded voice packets received from the gateway) could form a portion of a URL for a computer associated with the agent to which a socket request is sent. In this case, modifications to the customer call center may be necessary to make the association between the DTMF code entered by the agent and the URL. One simple way this can be achieved is by permanently assigning each agent terminal to one of the channels corresponding to the DTMF code. The agent, upon receiving a call, simply enters the DTMF code associated with the terminal he or she is using. Upon detection/receipt of the DTMF code, the end user terminal 120 sends a socket request to the URL formed in part by the DTMF code, which corresponds to the agent terminal.

In one simple, non-limiting example, a call center has agent stations (comprising a telephone extension connected to the PSTN and a PC connected to the Internet) for forty agents. Each of the agent PCs is assigned a URL with the same prefix, but ending with an "xx", where the "xx" represents a number from one to forty. One number is assigned to each of the PCs. This number is made known to the agents (such as by simply pasting a label with the "xx" number on each monitor). When a call is received, the agent keys in the "xx" number on the telephone keypad. When the DTMF tones are detected, the end user computer, which has knowledge of the prefix, appends the "xx" code corresponding to the DTMF tones to the prefix and directs a communication such as a socket request to the URL formed by the prefix and "xx" code. It will be readily understood that the foregoing is an extremely simple example and that this technique is not so limited.

Controlling the end user's display in a pure Internet telephony embodiment may be performed in a simpler (relative to the above-described methods), more direct manner. For example, referring now back to FIG. 2, when a call is made to the VoIP-ready call center 150, a CRM system therein sends a display code (not necessarily a dialpad sequence) to the terminal 120 (possibly through the call server 192 or the integration server 194). When the display code is received at the terminal 120, it is included in a download ( ) message sent to the merchant web server 141. The web page corresponding to the display code is then displayed at the terminal 120. Of course, more direct routes are also possible, especially where the web server 143 is in communication with the CRM system at the call center 150.

It will be appreciated by those of skill in the art that the functions performed by the application server 190, the call server 192, the integration server 194, the chat server 196, and/or the gateway 160 may be performed by a single physical device as a single process or as one or more separate processes, or may be performed in separate physical devices.

It should be understood that, although the preferred embodiments discussed herein are particularly useful in the realm of e-commerce, they have broader application. For example, he techniques discussed herein can be applied to general purpose Internet telephony applications, to Internet telephony conference call applications, as well as many other applications.

Obviously, numerous modifications and variations of the present invention are possible in light of the above teachings. It is therefore to be understood that within the scope of the appended claims, the invention may be practiced otherwise than as specifically described herein.

What is claimed is:

1. A method for identifying an end user at an end user computer connected to a data packet network to a called party connected to a public switched telephone network comprising the steps of:

establishing a phone call between an end user computer and a called party, the call being routed through a gateway connected to the data packet network and the public switched telephone network;

locating an identifier on the end user computer, the identifier being associated with a user of the end user computer, the identifier being present on the end user computer prior to an indication by the user that the phone call is desired;

converting the identifier to an analog signal; and transmitting the analog signal to the called party over the public switched telephone network.

2. The method of claim 1, wherein the identifier is sent from the end user terminal to the gateway and is converted into an analog signal at the gateway.

3. The method of claim 2, wherein the analog signal is transmitted according to an automatic number identification format.

4. The method of claim 2, wherein the analog signal is transmitted according to a caller identification format.

5. The method of claim 2, wherein the analog signal is transmitted according to a dialed number identification service format.

6. The method of claim 2, wherein the analog signal is transmitted in the same manner as voice information.

7. The method of claim 1, wherein the identification information is converted into a digitized packet at the end user computer and the digitized packet is transmitted to the gateway by the end user computer in the same manner as digitized voice data packets.

8. The method of claim 1, further comprising the step of displaying data associated with the identifier on a display associated with the called party.

9. A method for identifying an end user at an end user computer connected to a data packet network to a called party connected to a public switched telephone network comprising the steps of:

transmitting a web page to an end user computer, the web page including a telephone call icon and an identifier associated with the end user computer;

activating the icon at the end user computer, the icon causing a telephone call to be established between the end user computer and the called party through a gateway connected to the data packet network and the public switched telephone network;

converting the identifier to an analog signal;

transmitting the analog signal to the called party over the public switched telephone network.

10. The method of claim 9, wherein the identifier is sent from the end user computer to the gateway and is converted to an analog signal at the gateway.

11. The method of claim 10, wherein the analog signal is transmitted according to an automatic number identification format.

12. The method of claim 10, wherein the analog signal is transmitted according to a caller identification format.

13. The method of claim 10, wherein the analog signal is transmitted according to a dialed number identification service format.

14. The method of claim 10, wherein the analog signal is transmitted in the same manner as voice information.

15. The method of claim 10, wherein the identification information is converted into a digitized packet at the end user computer and the digitized packet is transmitted to the gateway by the end user computer in the same manner as digitized voice data packets.

16. The method of claim 10, further comprising the step of displaying data associated with the identifier on a display associated with the called party.

17. The method of claim 10, wherein the identifier is a session identification.

18. The method of claim 10, wherein the identifier is a is a customer number.

19. The method of claim 10, wherein the identifier is an icon identification.

20. A method for identifying an end user at an end user computer connected to a data packet network to called party equipment connected to a public switched telephone network comprising the steps of:

collecting, at the end user computer, customer identification information the customer identification information being present on the end user computer prior to an identification by the end user that a phone call is desired;

transmitting the customer identification information to a first server;

storing the customer identification information at the first server;

establishing a phone call between an end user computer and called party equipment, the call being routed through a gateway connected to the data packet network and the public switched telephone network;

detecting a gateway identifier at the called party equipment;

sending the gateway identifier to the first server;

using the gateway identifier to retrieve the customer identification information at the first server;

sending the customer identification information from the first server to the called party equipment.

21. The method of claim 20, wherein the customer identification information is collected from information included with an icon downloaded by the end user computer from a second server.

22. The method of claim 21, wherein the information included with the icon is a session identification.

23. The method of claim 21, wherein the information included with the icon is a customer number.

24. The method of claim 21, wherein the information included with the icon is an icon identification.

25. The method of claim 19, wherein the gateway identifier is used to retrieve the customer identification information by retrieving the customer identification information associated with a most recent call established through the gateway corresponding to the gateway identifier.

26. The method of claim 20, further comprising the steps of:

assigning, at the gateway, a gateway identifier to the call, the gateway identifier being different from any other gateway identifier associated with any other call being routed through the gateway during a duration of the call; and maintaining a database of customer identification information which can be indexed using the gateway identifier.

27. The method of claim 26, wherein the gateway identifier is in a caller identification format.

28. The method of claim 26, wherein the gateway identifier is in a dialed number identification service format.

29. A method for controlling a display of an end user computer comprising the steps of:

establishing a phone call between an end user computer connected to a data packet network and other party equipment connected to a public switched telephone network, the phone call being routed through a gateway connected to the data packet network and the public switched telephone network at the end user computer;

generating a dual tone multi-frequency (DTMF) command at the other party equipment;

detecting the DTMF command;

forming an address based at least in part on the DTMF command at the end user computer;

receiving display information from the address at the end user computer.

30. The method of claim 29, wherein the DTMF command is detected at the end user terminal in data packets received from the gateway.

31. The method of claim 29, wherein the DTMF command is detected at the gateway, and the gateway sends a message including the DTMF command to the end user computer.

32. The method of claim 31, wherein the DTMF command detected at the gateway is not sent in voice data packets.

33. The method of claim 31, wherein the address is formed at the gateway.

34. The method of claim 31, wherein the address is formed at a server in communication with the gateway and sent to the end user terminal.

35. The method of claim 29, wherein the address is formed at the end user terminal.

36. A method for exchanging information between an end user computer and a second terminal associated with a called party comprising the steps of:

assigning a chatroom identifier to the called party;

establishing a phone call between an end user computer connected to a data packet network and other party equipment connected to a public switched telephone network, the phone call being routed through a gateway connected to the data packet network and the public switched telephone network;

generating a dual tone multi-frequency (DTMF) command corresponding to the chatroom identifier at the other party equipment;

detecting the DTMF command;

entering the chatroom at the end user computer;

entering the chatroom at the second terminal; and exchanging messages between the end user terminal and the second terminal.

37. The method of claim 36, wherein the DTMF command is detected at the end user computer.

38. The method of claim 36, wherein the DTMF command is detected at the gateway.

39. The method of claim 36, wherein at least one of the messages includes an address from which display information can be obtained and the end user computer, upon receipt of such a message, obtains the display information from the address.

40. A method for exchanging information between an end user computer and a second terminal associated with a called party comprising the steps of:

assigning an address corresponding to the second terminal to the called party, the address comprising a first portion and a second portion;

establishing a phone call between an end user computer connected to a data packet network and other party equipment connected to a public switched telephone network, the phone call being routed through a gateway connected to the data packet network and the public switched telephone network;

storing the first portion of the address at the end user terminal;

generating a dual tone multi-frequency (DTMF) command at the other party equipment, the command comprising the second portion of the address assigned to the called party;

detecting the DTMF command;

forming the address at the end user terminal using the DTMF command and the first portion;

using the address to establish communications between the end user computer and the second terminal.

41. The method of claim 40, wherein the using step is performed by establishing a socket connection from the end user computer to the second terminal at the address.

42. The method of claim 40, wherein the DTMF command is detected at the gateway.

43. The method of claim 40, wherein the DTMF command is detected at the end user computer.

44. The method of claim 40, wherein the first portion of the address is stored at the end user computer along with software downloaded to the end user computer and used to establish the phone call.

* * * * *